United States Patent
Laporte et al.

(10) Patent No.: US 8,384,494 B2
(45) Date of Patent: Feb. 26, 2013

(54) MULTIBAND COUPLING CIRCUIT

(75) Inventors: Claire Laporte, Tours (FR); Hilal Ezzeddine, Tours (FR)

(73) Assignee: STMicroelectronics (Tours) SAS, Tours (FR)

( * ) Notice: Subject to any disclaimer, the term of this patent is extended or adjusted under 35 U.S.C. 154(b) by 358 days.

(21) Appl. No.: 12/821,761

(22) Filed: Jun. 23, 2010

(65) Prior Publication Data
US 2011/0001575 A1    Jan. 6, 2011

(30) Foreign Application Priority Data

Jun. 26, 2009    (FR) ...................................... 09 54370

(51) Int. Cl.
*H03H 7/46*    (2006.01)
*H01P 5/12*    (2006.01)

(52) U.S. Cl. ......... 333/110; 333/109; 333/116; 333/128
(58) Field of Classification Search .................. 333/109, 333/110, 112, 115, 116, 117, 118, 128
See application file for complete search history.

(56) References Cited

U.S. PATENT DOCUMENTS

| | | | |
|---|---|---|---|
| 3,833,866 A * | 9/1974 | Boutelant ...................... | 333/104 |
| 4,652,880 A * | 3/1987 | Moeller et al. ................ | 342/373 |
| 4,827,270 A * | 5/1989 | Udagawa et al. ............. | 343/853 |
| 6,745,046 B1 | 6/2004 | Eckert et al. | |
| 7,609,205 B2 * | 10/2009 | Haskell ......................... | 342/368 |
| 7,671,698 B2 * | 3/2010 | Dupont et al. ................ | 333/109 |
| 7,961,064 B2 * | 6/2011 | Kearns et al. ................. | 333/109 |
| 2005/0212617 A1* | 9/2005 | Chen ............................ | 333/116 |
| 2009/0128255 A1 | 5/2009 | Dupont et al. | |
| 2012/0122410 A1* | 5/2012 | Laporte et al. ................. | 455/80 |
| 2012/0194293 A1* | 8/2012 | Dupont et al. ................ | 333/109 |

OTHER PUBLICATIONS

French Search Report dated Apr. 9, 2010 from corresponding French Application No. 09/54370.

* cited by examiner

*Primary Examiner* — Dean O Takaoka
(74) *Attorney, Agent, or Firm* — Wolf, Greenfield & Sacks, P.C.

(57) ABSTRACT

A distributed multiband coupling circuit including: a number n of first and of second terminals equal to the number of frequency bands; a third terminal and a fourth terminal; a number n of distributed couplers equal to the number of frequency bands, all couplers being identical and sized according to the highest frequency band, and each coupler including a first conductive line between first and second ports intended to convey a signal to be transmitted in the concerned frequency band, and a second conductive line coupled to the first one between third and fourth ports; a first set of resistive splitters in cascade between the third ports of the couplers, a terminal of the splitter associated with the first coupler being connected to the third terminal of the coupling circuit; and a second set of resistive splitters in cascade between the fourth ports of the couplers, a terminal of the splitter associated with the first coupler being connected to the fourth terminal of the coupling circuit.

15 Claims, 4 Drawing Sheets

MULTIBAND COUPLING CIRCUIT

CROSS REFERENCE TO RELATED APPLICATIONS

This application claims the priority benefit of French patent application Ser. No. 09/54370, filed on Jun. 26, 2009, entitled "MULTIBAND COUPLING CIRCUIT," which is hereby incorporated by reference to the maximum extent allowable by law.

BACKGROUND OF THE INVENTION

1. Field of the Invention

The present invention generally relates to the electronics industry, and more specifically to radio transceiver systems. The present invention more specifically relates to a multiband bidirectional coupler.

2. Discussion of the Related Art

A coupler is generally used to sample part of the power present on a so-called main or primary transmission line, to direct it towards another so-called coupled or secondary line, located nearby. Couplers can be divided in two categories according to whether they are formed of discrete passive components (lumped-element couplers) or of conductive lines close enough to one another to be coupled (distributed couplers). The present invention relates to the second category of couplers. The ports of the main line are generally designated as IN (input) and OUT (output). Those of the coupled line are generally designated as CPLD (coupled) and ISO (isolated).

In many applications, part of the power transmitted over a line needs to be sampled, for example, to control the power of an amplifier in a transmission system, to control the linearity of a transmitter amplifier according to the losses linked to the reflection of an antenna, to dynamically match an antenna, etc.

The main parameters of a coupler are:

insertion losses, which represent the transmission loss between ports IN and OUT of the main line (insertion losses are defined while the two other ports CPLD and ISO of the coupler are loaded with a 50-ohm impedance);

the coupling, which represents the transmission loss between ports IN and CPLD (the coupling is then defined while the two ports OUT and ISO are loaded with a 50-ohm impedance);

the isolation, which represents the transmission loss between ports IN and ISO (the isolation is defined while the two other ports OUT and CPLD are loaded with a 50-ohm impedance); and the directivity which represents the transmission loss difference between ports ISO and CPLD, from port IN.

Theoretically, an ideal coupler exhibits an infinite directivity, that is, no power is present on the port of its secondary line located in front of the output port of its main line when a signal flows from the input port to the output port of this main line. In practice, a coupler is said to be directional when its directivity is sufficient (typically greater than 20 dBm) for the powers recovered on the accesses of its secondary line to enable to determine the power flow direction in the main line. When the two ports of the secondary line of the coupler are used to simultaneously have the power information, the coupler is said to be bidirectional.

Increasingly, radio transceiver devices are capable of operating in several frequency bands. Such is for example the case for mobile telephony, where cell phones have evolved from bi-band to tri-band, then to quadband.

The transceiver chain then comprises as many paths as the device is able to process frequency bands, both in transmit and in receive mode. Each path is associated with a coupler sized according to the frequency band to be processed. In particular, the lengths of the main and secondary lines depend on this frequency band.

This need for a different sizing of the couplers complicates the manufacturing. Further, with couplers of different lengths, there are directivity variations from one coupler to the other, which is not desirable.

In a coupler, if the two ports of its secondary line and the output port of its main line are perfectly matched, no stray reflection occurs. Such a perfect matching can unfortunately not be obtained in practice. In particular, the port on which the power portion is sampled by coupling is seldom ideally matched. As a result, stray reflections generate errors on the recovered information.

A mismatch of the port of the secondary line of the coupler from which the information is sampled may have different origins. Most often, the coupler is placed on an insulating substrate (for example, of printed circuit type) to be associated with other circuits. It is then not possible to ensure a perfect matching (typically, 50 ohms) of the measurement port. Further, if the couplers have different sizes, this matching risks to vary from one coupler to the other.

SUMMARY OF THE INVENTION

Thus, at least one embodiment of the present invention aims at overcoming all or part of the disadvantages of multiband radio transceiver structures using one coupler per path.

An object of an embodiment of the present invention is to decrease the bulk of a multiband coupling structure.

Another object of an embodiment of the present invention is to improve the reliability of measurements by making them little sensitive or insensitive to a variation of the matching of circuits connected to the measurement port.

To achieve all or part of these objects as well as other, one embodiment of the present invention provides a distributed multiband coupling circuit comprising:

a number n of first and of second terminals equal to the number of frequency bands;

a third terminal and a fourth terminal;

a number n of distributed couplers equal to the number of frequency bands, all couplers being identical and sized according to the highest frequency band, and each coupler comprising a first conductive line between first and second ports intended to convey a signal to be transmitted in the concerned frequency band, and a second conductive line coupled to the first one between third and fourth ports;

a first set of resistive splitters in cascade between the third ports of the couplers, a terminal of the splitter associated with the first coupler being connected to the third terminal of the coupling circuit; and a second set of resistive splitters in cascade between the fourth ports of the couplers, a terminal of the splitter associated with the first coupler being connected to the fourth terminal of the coupling circuit.

According to an embodiment of the present invention, a terminal of each resistive splitter associated with the last coupled is grounded by a resistive element having a value which is three times that of the respective resistive elements of the splitters.

According to an embodiment of the present invention, the resistive splitters associated with the coupler of rank n−1 are connected to the third and fourth ports of the coupler of rank n.

According to an embodiment of the present invention, each resistive splitter comprises three resistors of the same value.

According to an embodiment of the present invention, the value of the resistances of the resistive splitters is selected to correspond to one third of the matched impedance of the circuit.

According to an embodiment of the present invention, the second line of each coupler is interrupted approximately at its center, the two intermediary ends being connected to attenuators.

The present invention also provides a circuit of multiband transmission or reception of radio frequency signals, comprising:
as many amplifiers as there are frequency bands;
a coupling circuit; and
a circuit, common to the different amplifiers, for measuring information sampled from the third port of the circuit.

The foregoing objects, features, and advantages of the present invention will be discussed in detail in the following non-limiting description of specific embodiments in connection with the accompanying drawings.

DETAILED DESCRIPTION

Figure 1:
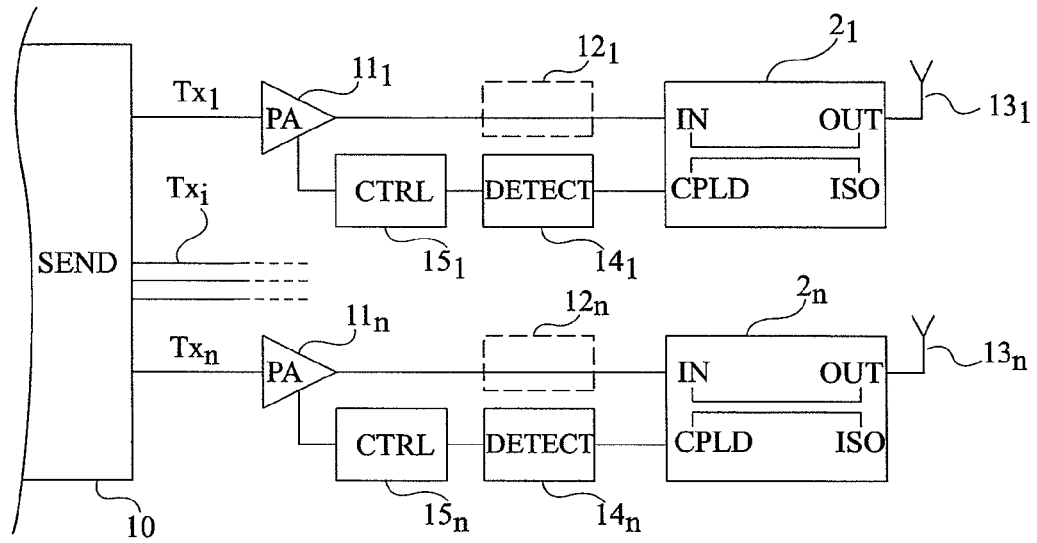
FIG. 1 is a simplified representation in the form of blocks of a radio transmission chain of the usual type.

The same elements have been designated with the same reference numerals in the different drawings. For clarity, only those elements which are useful to the understanding of the present invention have been shown and will be described. In particular, the circuits upstream and downstream of the multiband coupling structure have not been detailed, the present invention being compatible with usual circuits.

FIG. 1 is a block diagram of a usual example of a transmission chain capable of transmitting in several frequency bands. This type of circuit, for example, equips communication devices of mobile telephony type.

An electronic transmission circuit 10 (SEND) is capable of generating signals $Tx_i$ (with i ranging between 1 and n) to be transmitted according to the frequency band used. These signals are sent onto power amplifiers $11_i$ (PA) having their respective outputs crossing various processing and matching circuits $12_i$ illustrated in dotted lines. Such circuits $12_i$ comprise, among others and without it being a limitation, impedance matching devices towards transmit antennas $13_i$. To be able to adjust the power of amplifier $11_i$ or any other element (adjustable impedance matching network, etc.), a coupler $2_i$ is interposed, for example, between the output of circuit $12_i$ and the corresponding antenna. Path splitters (not shown) may be interposed between the coupler and the antenna. Such splitters are used to separate the transmission from the reception, which is processed by a radio frequency receive line, not shown.

Each coupler $2_i$ comprises a main line interposed between amplifier $11_i$ and antenna $13_i$ (or between the output of circuit $12_i$ and antenna $13_i$). A so-called port or access IN is located on the side of amplifier 11 while a so-called port or access OUT (sometimes also called DIR) is located on the side of antenna $13_i$. A coupled or secondary line of the coupler samples part of the power of the main line. A port CPLD of the coupler, corresponding to the end of the secondary line on the side of port IN, provides information about the measurement. This information depends, among others, on the losses due to the antenna reflection. It being a directional coupler, end ISO of the secondary line, on the side of port OUT, is not used. It is loaded with a reference impedance of the circuit (typically 50 ohms). In the example of FIG. 1, the measurement, which provides an indication about the reflection losses generated by the antenna, is used to match the amplifier gain by means of a circuit $14_i$ (DETECT) for detecting the level on port CPLD of the corresponding coupler and of a circuit $15_i$ (CTRL) receiving the information measured by the detector and controlling the gain of the corresponding amplifier $11_i$.

The measurement of the reflection losses of the antenna may also enable a dynamic matching of the antenna if said antenna has this functionality.

As indicated previously, the multiplication of the control and detection circuit adversely affects the miniaturization of radio transmission lines. Further, in most applications and especially in mobile telephony, a single line is used at a given time, so that it would be desirable to be able to share at least the control and detection circuits.

Figure 2:
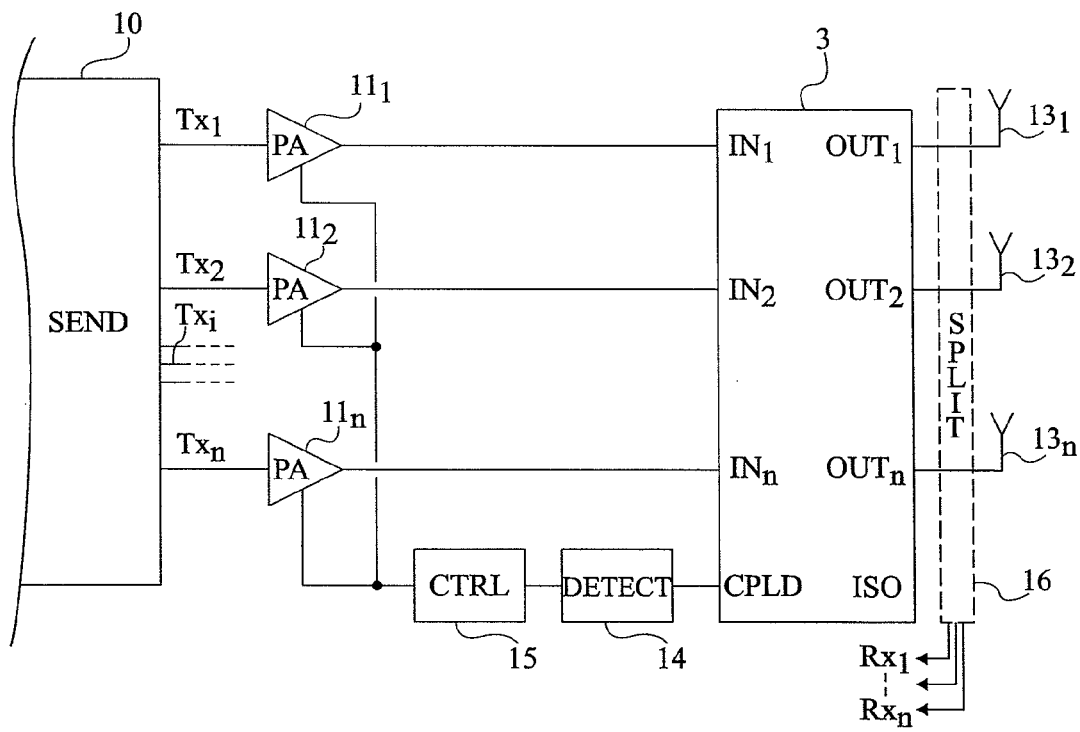
FIG. 2 is a block diagram of an embodiment of a multiband radio transmission chain.

FIG. 2 is a block diagram to be compared with that of FIG. 1 illustrating a radio frequency transmit chain with a multiband coupling circuit.

As previously, a circuit 10 with n paths is capable of generating signals $Tx_i$ (with i ranging between 1 and n) over different frequency bands which are sent onto adjustable-gain transmitter amplifiers $11_i$. The respective outputs of amplifiers $11_i$ are sent onto n inputs $IN_i$ of a multiband coupling circuit 3. This circuit comprises the same number of outputs $OUT_i$ intended to be connected to antennas $13_i$ assigned to the different bands. In the example of FIG. 2, a splitter (SPLIT) 16 has been symbolized in dotted lines to separate the transmit flows from the receive flows at the level of antennas $13_i$ and to provide signals $Rx_i$ to a receive line, not shown. Circuit 3 only comprises one CPLD port and one ISO port. Port CPLD is connected to a detector 14 having its output connected to a control circuit 15. The output of control circuit 15 is connected to the respective gain control inputs of amplifiers $11_i$. Circuits for switching and routing signals may be interposed between control circuit 15 and the gain control inputs of amplifiers $11_i$.

Figure 3:
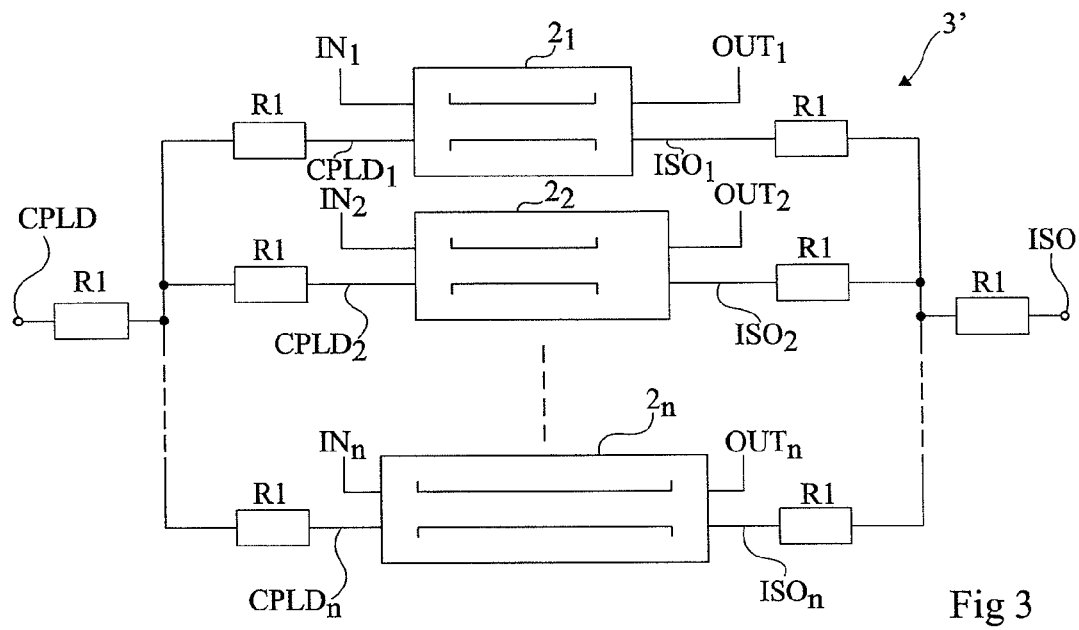
FIG. 3 illustrates a first multiband coupling circuit solution.

FIG. 3 shows a current example of a multiband coupling circuit 3' capable of being used in the chain of FIG. 2. Circuit 3' comprises n couplers $2_i$ having the respective inputs and outputs of their main lines defining the different terminals $IN_i$ and $OUT_i$ of circuit 3'. Terminals $CPLD_i$ and $ISO_i$ of the different couplers $2_i$ are connected via an impedance matching network to terminals CPLD and ISO of circuit 3'. Typically, each terminal $CPLD_i$ is connected to terminal CPLD by a series connection of two resistors R1, one of these resistors being shared by all the connections. The same structure is reproduced on the side of terminal ISO. All resistors R1 have the same value. This value is calculated according to the impedance R desired for the coupler (typically 50 ohms) and corresponds to R1=R(n−1)/(n+1). With such values, an attenuation between two ports depending on the number of bands is obtained.

Since the coupling should be constant for all bands to enable a proper detection and measurement independently from the concerned band, couplers $2_i$ exhibit different line lengths according to the frequency band. In practice, these lengths correspond to those of separated couplers (FIG. 1). This results in a greater manufacturing complexity. Further, the directivity varies since the coupler directivity depends on the line length. It is thus not possible to obtain a constant directivity for all bands.

Figure 4:
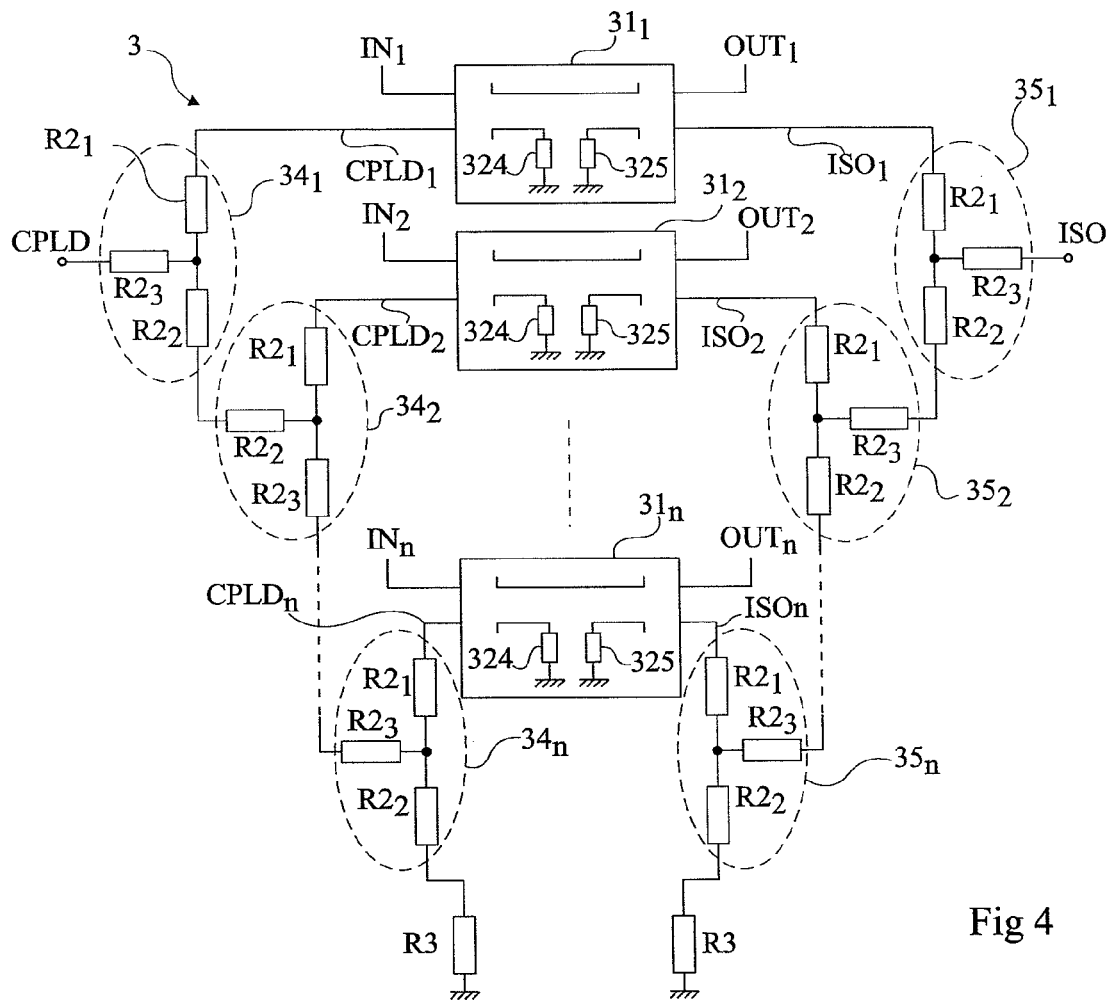
FIG. 4 shows an embodiment of a multiband coupling circuit.

FIG. 4 shows an embodiment of a multiband coupling circuit 3 enabling to obtain an approximately identical directivity for all bands.

As in the circuit of FIG. 3, a distributed coupler $31_i$ is assigned to each frequency band. However, all couplers $31_i$ have equal line lengths and are preferably identical (in shape, materials, etc.). The fact for the line lengths to be identical results in couplers all having the same intrinsic directivity, and thus in a coupling circuit with a directivity independent from the frequency band.

Each port $CPLD_i$ and each port $ISO_i$ is connected to terminal CPLD, respective ISO, of circuit 3 by a number of resistive stages $34_i$, respectively $35_i$, corresponding to its rank i. Each resistive stage $34_i$ or $35_i$ comprises three resistors R2 in a T structure and forms a resistive splitter. Terminal $CPLD_i$, respectively $ISO_i$, of each coupler $31_i$ is connected to one end of a first resistor $R2_1$ of its stage $34_i$, respectively $35_i$. This first resistor $R2_1$ is in series with a second resistor $R2_2$ of the same stage so as to, except for those of last stages $34_n$ and $35_n$ of last coupler $31_n$, be connected to the third resistor $R2_3$ of stage $34_{i+1}$, respectively $35_{i+1}$, of the next coupler (in terms of rank i). Except for stages $34_1$ and $35_1$ of first coupler $31_1$, the junction point of the first and second resistors $R2_1$ and $R2_2$ of a stage $34_i$, respectively $35_i$, is thus connected by the third resistor $R2_3$ of this stage to the second resistor R2 of stage $34_{i-1}$, respectively $35_{i-1}$, of the previous coupler. The third resistors $R2_3$ of stages $34_1$ and $35_1$ of first coupler $31_1$ are respectively connected to terminals CPLD and ISO of circuit 3. The second resistors of stages $34_n$ and $35_n$ of last coupler $31_n$ are respectively grounded by a resistor R3. The value of this resistor R3 corresponds to three times the values of resistors R2. The resistive splitters $34_i$ thus formed are in cascade between the different couplers. Functionally, each coupler sees, on its port $CPLD_i$, a resistor of value R3 and terminal CPLD of circuit 3 also sees a resistor of value R3. The same applies for terminals ISO and $ISO_i$.

Figure 5:
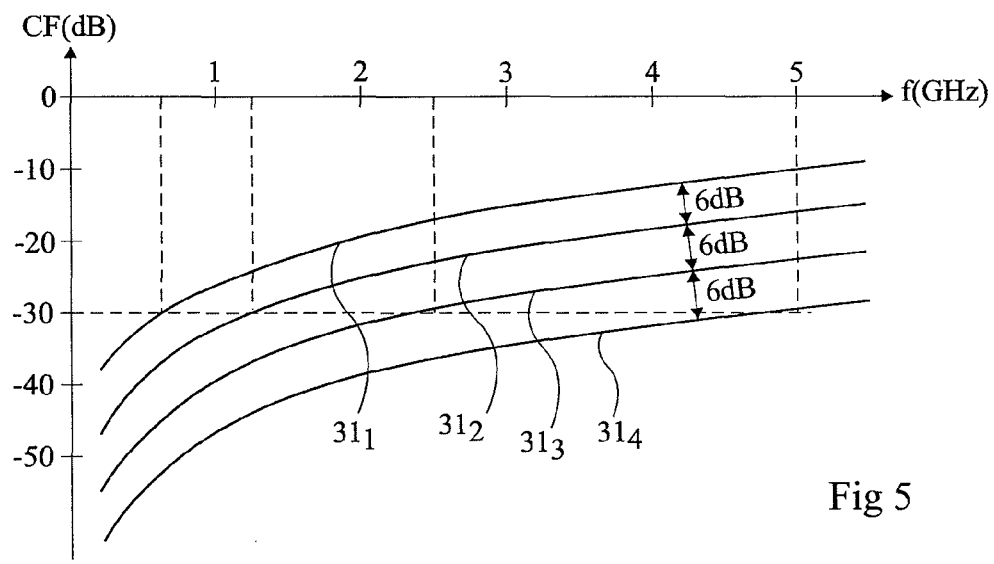
FIG. 5 illustrates the coupling factor of the circuit of FIG. 4 according to frequency.

FIG. 5 shows an example of coupling factors CF obtained according to the frequency with a coupling circuit 3 such as shown in FIG. 4. A circuit of four couplers $31_i$ having respective responses designated by the reference numerals of the couplers ($31_1$ to $31_4$) is assumed. It can be seen that the curves of the coupling factor versus the frequency are shifted by 6 dB from one coupler to the other. It is thus possible to size a coupler according to the directivity and to the coupling factor desired for the maximum frequency band (in the example of coupler $31_4$, to obtain a coupling ranging from −30 dB to 5 GHz). Then, the successive attenuations provided by stages $34_i$ and $35_i$ provide coupling factors of −30 dB for lower frequency bands.

Each splitter introduces a 6-dB attenuation. Accordingly, the attenuation between port CPLD of circuit 3 and port $CPLD_i$ of a coupler $31_i$ is proportional to rank i of this coupler and is equal to 6 dB multiplied by the rank of the stage.

Preferably, couplers $31_i$ have an improved structure in terms of directivity to avoid the occurrence of certain malfunctions, for example, a detection error which, in a coupler of the type in FIG. 1, occurs if the reflection losses correspond to an attenuation greater than the directivity (reflected signal more attenuated than the directivity coefficient).

In practice, it is considered that from a 20-dB directivity, the coupler is satisfactory. As for the coupling factor, a coupling lower than −30 dB is often required to avoid too strong an attenuation of the transmitted signal (a −30-dB coupling corresponds to the sampling of one thousandth of the transmitted power).

Figure 6:
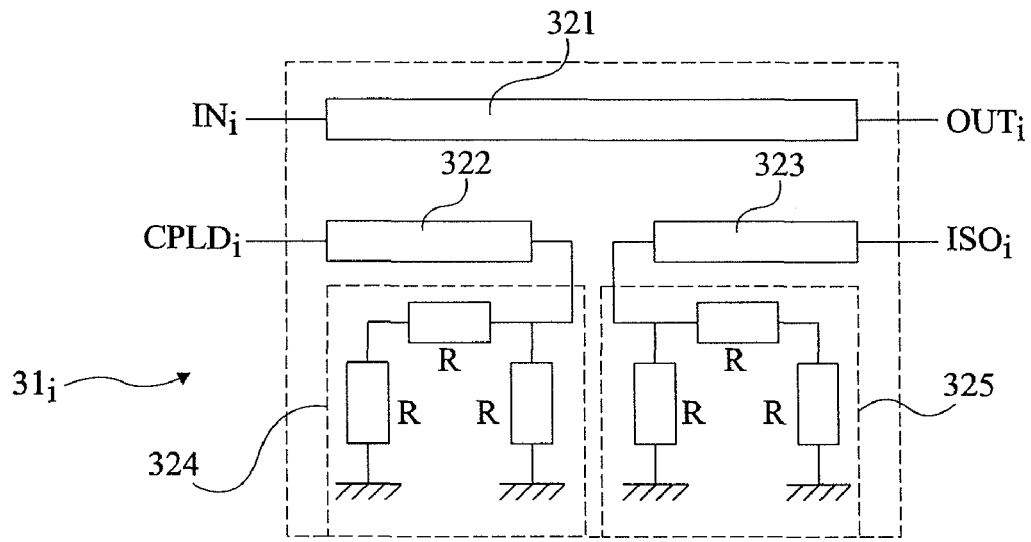
FIG. 6 details the forming of each coupler of the circuit of FIG. 4.

FIG. 6 shows an embodiment of a coupler $31_i$ of improved directivity of the type used in the circuit of FIG. 4. Distributed coupler $31_i$ comprises a main line 321, intended to be interposed on the transmission line by its two respective input and output ports or terminals $IN_i$ and $OUT_i$. A secondary line, formed of two sections 322 and 323 parallel to line 321, defines the portions or terminals $CPLD_i$ and $ISO_i$ intended to convey the information proportional to the power transmitted in line 321. Sections 322 and 323 are preferably symmetrical, that is, of same length. Their respective external ends are connected to ports $CPLD_i$ and $ISO_i$. Their respective internal ends are connected to attenuators 324 and 325. Each attenuator is for example formed of three P-coupled resistors R. A first resistor R is interposed in series at each end 322 or 323 of the line while the two other resistors R connect the two ends of the first resistor to ground. The values of resistors R are all identical for both attenuators 324 and 325.

Attenuators 324 and 325 are preferably selected to provide an attenuation at least equal to half the coupler directivity. Taking the example of a coupler having a −30-dB directivity, this means that attenuators 324 and 325 each are of at least 15 dB. The coupler structure shown in FIG. 5 enables getting rid of the influence of the loads present on ports $CPLD_i$ and $ISO_i$. In practice, such a coupler is made in the form of conductive tracks supported by an insulating substrate. Most often, the lines are rectilinear and their length is selected according to the operating frequency of coupler 2 (for example, the length of line 321 is a multiple of λ/2). A coupler such as described in relation with FIG. 6 corresponds to the bidirectional coupler described in French patent application N° 07/59185-07/TO/295-296, B8533.

Figure 7:
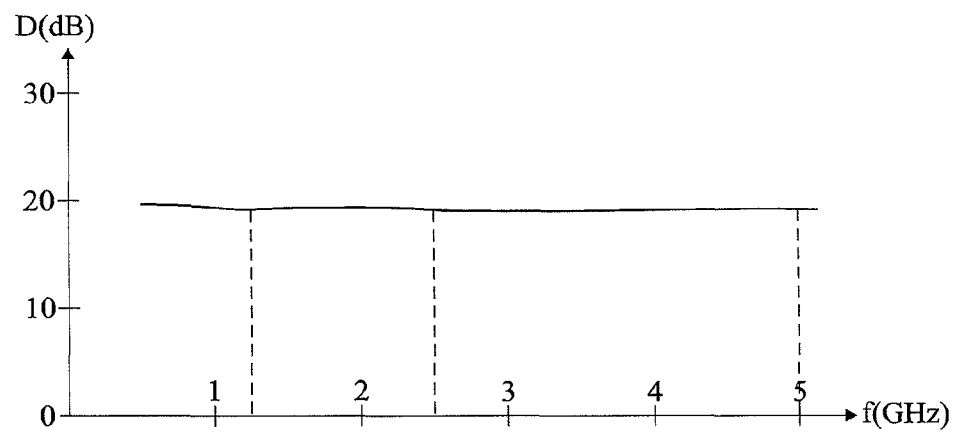
FIG. 7 illustrates the variation of the directivity of the circuit of FIG. 4 according to frequency.

FIG. 7 shows the curve of the directivity of coupling circuit 3 according to frequency. This curve is approximately planar around 25 dB.

The example of FIGS. 5 and 7 has been obtained for couplers having line lengths of approximately 1 mm and a matching value R3 of 50 ohms, and thus resistance values R2 of 16.67 ohms. The respective frequencies of the stages, for a −30-dB coupling factor, correspond to 5 GHz for coupler $31_4$, 2.4 GHz for coupler $31_3$, 1.2 GHz for coupler $31_2$, and 800 MHz for coupler $31_1$.

Figure 8:
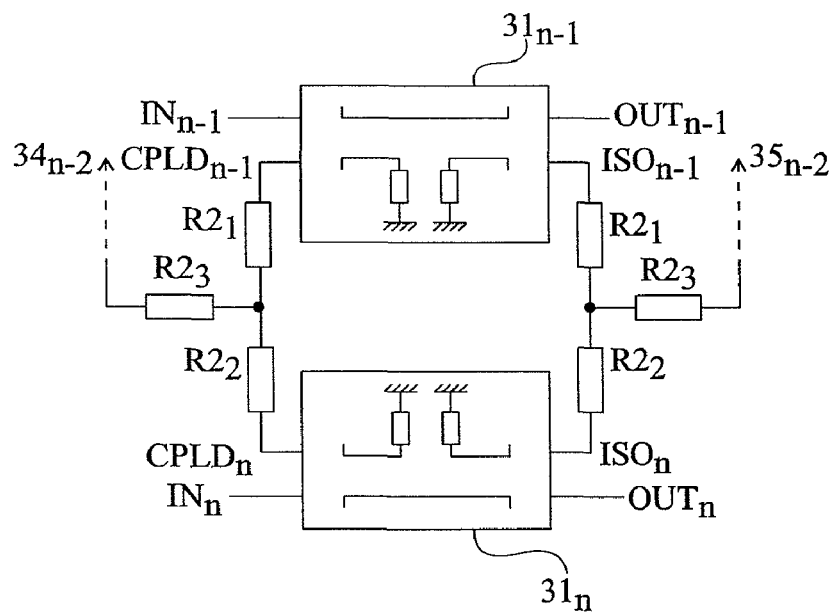
FIG. 8 partially shows a variation of the circuit of FIG. 4.

FIG. 8 shows a variation of the structure of FIG. 4 in which resistor R3 is replaced with last coupler $31_n$ by connection of its terminals $CPLD_n$ and $ISO_n$ to the second respective resistors $R2_2$ of the attenuators of stage n−1. Such an embodiment enables obtaining a last stage with performance similar to those of the previous stage and may be used, for example, for applications in which the last two frequency bands are close to each other.

In practice, the number of frequency bands of the transmission chains of the application more specifically aimed by embodiment of the present invention is on the order of from 3 to 4 bands.

The described structure is compatible with an integration of the couplers and of the resistors. It enables gaining space by making it possible to size the coupler lines for the highest frequency.

Various embodiments with different variations have been described hereabove. It should be noted that those skilled in the art can combine various elements of these various embodiments and variations without showing any inventive step.

Further, the practical forming of the above-described multiband circuit is within the abilities of those skilled in the art based on the given functional indications. For example, the selection of the resistance values of the coupler may be modified according to the desired impedance matching.

Further, although the present invention has been more specifically described in relation with an example of a transmit chain, the described multiband coupling circuit may also be used in a receive chain.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A distributed multiband coupling circuit comprising:
a number n of first and of second terminals equal to the number of frequency bands;
a third terminal and a fourth terminal;
a number n of distributed couplers equal to the number of frequency bands, all couplers being identical and sized according to the highest frequency band, and each coupler comprising a first conductive line between first and second ports intended to convey a signal to be transmitted in the concerned frequency band, and a second conductive line coupled to the first one between third and fourth ports;
a first set of resistive splitters in cascade between the third ports of the couplers, a terminal of the splitter associated with the first coupler being connected to the third terminal of the coupling circuit; and
a second set of resistive splitters in cascade between the fourth ports of the couplers, a terminal of the splitter associated with the first coupler being connected to the fourth terminal of the coupling circuit.

2. The circuit of claim 1, wherein a terminal of each resistive splitter associated with the last coupler is grounded by a resistive element having a value which is three times that of the respective resistive elements of the splitters.

3. The circuit of claim 1, wherein the resistive splitters associated with the coupler of rank n−1 are connected to the third and fourth ports of the coupler of rank n.

4. The circuit of claim 1, wherein each resistive splitter comprises three resistors of same value.

5. The circuit of claim 4, wherein the value of the resistances of the resistive splitters is selected to correspond to one third of the matched impedance of the circuit.

6. The circuit of claim 1, wherein the second line of each coupler is interrupted approximately at its center, the two intermediary ends being connected to attenuators.

7. A circuit of multiband transmission or reception of radio-frequency signals, comprising:
as many amplifiers as there are frequency bands;
the coupling circuit of claim 1; and
a circuit, common to the different amplifiers, for measuring information sampled from the third port of the circuit.

8. A multiband coupling circuit comprising: a plurality of distributed couplers, each assigned to a frequency band and each having a first port defining a first terminal of the coupling circuit, a second port defining a second terminal of the coupling circuit, a third port and a fourth port, wherein the coupling circuit has a plurality of first terminals and a plurality of second terminals; a first resistive splitter network interconnecting a third terminal of the coupling circuit and the third ports of each of the distributed couplers; and a second resistive splitter network interconnecting a fourth terminal of the coupling circuit and the fourth ports of each of the distributed couplers, wherein the first resistive splitter network comprises first resistive splitter stages corresponding to respective distributed couplers, wherein the first resistive splitter stages are connected in cascade between the third ports of the distributed couplers, and wherein the second resistive splitter network comprises second resistive splitter stages corresponding to respective distributed couplers, wherein the second resistive splitter stages are connected in cascade between the fourth ports of the distributed couplers.

9. A multiband coupling circuit as defined in claim 8, wherein a first resistive splitter stage corresponding to a last distributed coupler in the cascade connection is connected to ground by a resistive element having a value which is three times the value of the resistive elements of the first resistive splitter stages and wherein a second resistive splitter stage corresponding to the last distributed coupler in the cascade connection is connected to ground by a resistive element having a value which is three times the value of the resistive elements of the second resistive splitter stages.

10. A multiband coupling circuit as defined in claim 8, wherein the first resistive splitter stages each include a first resistor connected to a third port of the corresponding distributed coupler, a second resistor connected to a next first resistive splitter stage or to ground and a third resistor connected to the third terminal of the coupling circuit or to a previous first resistive splitter stage, wherein the first, second and third resistors of each first resistive splitter stage are connected to a common node.

11. A multiband coupling circuit as defined in claim 10, wherein the second resistive splitter stages each include a first resistor connected to a fourth port of the corresponding distributed coupler, a second resistor connected to a next second resistive splitter stage or to ground and a third resistor connected to the fourth terminal of the coupling circuit or to a previous second resistive splitter stage, wherein the first, second and third resistors of each second resistive splitter stage are connected to a common node.

12. A multiband coupling circuit as defined in claim 8, wherein the distributed couplers are identical.

13. A multiband coupling circuit as defined in claim 8, wherein each distributed coupler comprises a first conductive line between the first and second ports of the distributed coupler and a second conductive line coupled to the first conductive line between the third and fourth ports of the distributed coupler.

14. A multiband coupling circuit as defined in claim 11, wherein the first, second and third resistors of each of the resistive splitter stages have equal values.

15. A multiband coupling circuit as defined in claim 14, wherein a value of the first, second and third resistors of each of the resistive splitter stages is one third of a matched impedance of the coupling circuit.

* * * * *